(12) United States Patent
Robinson et al.

(10) Patent No.: US 8,964,234 B1
(45) Date of Patent: Feb. 24, 2015

(54) AUTO-DEVELOPING NEW PRINT QUEUES AND PRINT ATTRIBUTE SUBSETS

(71) Applicant: Xerox Corporation, Norwalk, CT (US)

(72) Inventors: David C. Robinson, Penfield, NY (US); Gerald A. Wedekind, Ranchos Palos Verdes, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/259,792

(22) Filed: Apr. 23, 2014

(51) Int. Cl.
  *G06F 3/12* (2006.01)
(52) U.S. Cl.
  CPC ............... *G06F 3/126* (2013.01); *G06F 3/1204* (2013.01); *G06F 3/1258* (2013.01); *G06F 3/1264* (2013.01)
  USPC ........................................ 358/1.15; 358/1.16
(58) Field of Classification Search
  USPC .................... 358/1.12, 1.13, 1.14, 1.15, 1.16; 718/101, 102, 104, 105
  See application file for complete search history.

(56) References Cited

U.S. PATENT DOCUMENTS

| 6,775,665 | B1 | 8/2004 | Piersol |
| 6,788,429 | B1 | 9/2004 | Clough et al. |
| 7,926,068 | B2 | 4/2011 | Sedky et al. |
| 8,107,115 | B2 | 1/2012 | Morales et al. |
| 8,477,343 | B2 | 7/2013 | Cech et al. |

*Primary Examiner* — Vu B Hang
(74) *Attorney, Agent, or Firm* — Gibb & Riley, LLC

(57) ABSTRACT

Methods, devices, and systems process print jobs and identify print job settings originating from sources other than the system's existing set of print queues. These methods, devices, and systems can then identify frequently occurring combinations of such setting values. With these combinations as input, they can create new, additional print queues (that are formed in addition to the existing print queues) that apply these frequently occurring setting values to additional print jobs that are subsequently processed through the additional print queues; or can create attribute subsets which can be presented as menu selections to simplify subsequent creation of print queues, or updating of print queue programming or individual job programming.

20 Claims, 6 Drawing Sheets

AUTO-DEVELOPING NEW PRINT QUEUES AND PRINT ATTRIBUTE SUBSETS

BACKGROUND

Systems and methods herein generally relate to print queues and more particularly to methods, systems, and devices that automatically generate print queues and attribute subsets.

In sophisticated printing environments print queues are used to perform a number of varied functions (sometimes referred to as print or save; print&save; or hold). For example, print queues can hold print jobs until the required processing apparatus is available, can redirect the print job to the most appropriate processing apparatus, etc., and print queues can supply attribute/value pairs to the print job. Such attribute/value pairs control the operating parameters of the mechanical processing devices (e.g., printers, finishing equipment, etc.) and software (e.g. color management software, imposition software) that eventually execute the print job. The job ticket, the job content (the page description language or PDL), and job-specific settings entered at the print server's GUI are additional points in the workflow where such attribute/value pairs can be supplied. Since different values for a given attribute may be supplied by these different attribute sources, printing systems generally employ a reconciliation process to determine which of these values to actually use, based on precedence or other fixed rules. These reconciliation processes may be complex.

Allowing attribute values to be programmed on each print queue of a printing system can significantly reduce labor and error rates, because each job sent to a given queue can inherit the attribute values of the queue rather than needing to be individually programmed with a large number of attribute values.

The process of programming a system's print queues is itself time consuming and requires system administrator (SA) expertise, as it can involve tens to hundreds of attributes on each of a large number of queues, and must consider many different job/workflow variants (and the frequency of each), which may vary over time. The SA must be intimately familiar with the system's attribute reconciliation process in order to understand how attribute value/pairs programmed on a queue will affect the values actually used by the system. Finally, some printing systems allow SAs to control the precedence level of queue attributes relative to other attribute sources, sometimes on a per-attribute basis. These precedence levels must be specified with care to achieve the desired outcomes.

SUMMARY

Various methods herein process print jobs using a computerized device. Such methods automatically identify, within the print jobs, print setting values that originate from sources other than the print queues (e.g., from job tickets, job settings entered at the job management user interface, page description language setpoints, etc.).

Such methods then automatically identify "frequently-occurring" combinations of such non-queue-originated print setting values.

These methods can then automatically create new, additional print queues (that are formed in addition to the existing print queues) that are programmed with, and therefore automatically apply, these frequently occurring sets of attribute/value pairs to additional print jobs that are subsequently processed through the additional print queues.

With methods herein, the automatic creation of additional print queues is based on a comparison of a) the job attribute values (i.e. job settings) actually used, vs b) the job attribute values programmed on the already-existing queues in the system. The settings "actually used" on a given job can be the result of an attribute reconciliation process whereby the attribute source of highest precedence 'wins', and it is this reconciled attribute value that gets used by the methods herein.

In some situations, rather than automatically creating an additional print queue, the methods herein can identify an existing print queue that would better accommodate future jobs of the same kind (by requiring less job specific programming) than the print queue currently being utilized.

As an optional refinement to the "frequently occurring" criterion, the methods herein can optionally be extended to heuristically estimate how much job programming time the automatic creation of a new print queue will save based on additional factors beyond occurrence frequency (for example, based on the number of attribute values which would be uniquely incorporated into the newly-created queue).

Alternative methods described herein can automatically create attribute subsets (templates, library entries, etc.) within the print queues (base on criteria such as the amount of job programming time that would be saved, as explained above). These print attribute subsets comprise frequently occurring sets of attribute values within a single categorical grouping and are presented to the user as a menu selection to simplify (via industry standard methods) the programming of new (or updating of existing) print queues, and the updating of individual job programming.

Apparatuses herein include a print server that has, among other components, an input/output port processing print jobs, a processor operatively (meaning directly or indirectly) connected to the input/output port, a graphic user interface operatively connected to the processor, etc.

The processor automatically identifies, within the print jobs, print queue printing and finishing settings originating from print queues, and additional printing and finishing settings from sources other than the print queues. The processor automatically identifies "frequently-occurring" combinations of such non-queue-originated print setting values. (e.g., those attributes and associated values that have occurrences that exceed a threshold).

The processor can then automatically create additional print queues that are programmed with, and therefore automatically apply, these frequently occurring sets of attribute/value pairs to additional print jobs that are subsequently processed through the additional print queues and present the same to the user on the graphic user interface. The processor can also automatically create print attribute subsets within the print queues. Again, the print attribute subsets can be categorical/logical groupings of the frequently occurring sets of attribute/value pairs and are presented as a menu selection to the user on the graphic user interface for altering the existing print queues.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, print queue properties/parameters are commonly defined or revised in a laborious process by a system administrator. In view of this, the systems and methods herein provide a mechanism that analyzes commonly occurring instances of groups of job setpoints. The analysis is used to automatically create new queues and/or attribute subsets. This saves users and SAs the effort of entering the commonly occurring setpoints repeatedly, and SAs much of the laborious effort of defining new queues.

Figure 1:
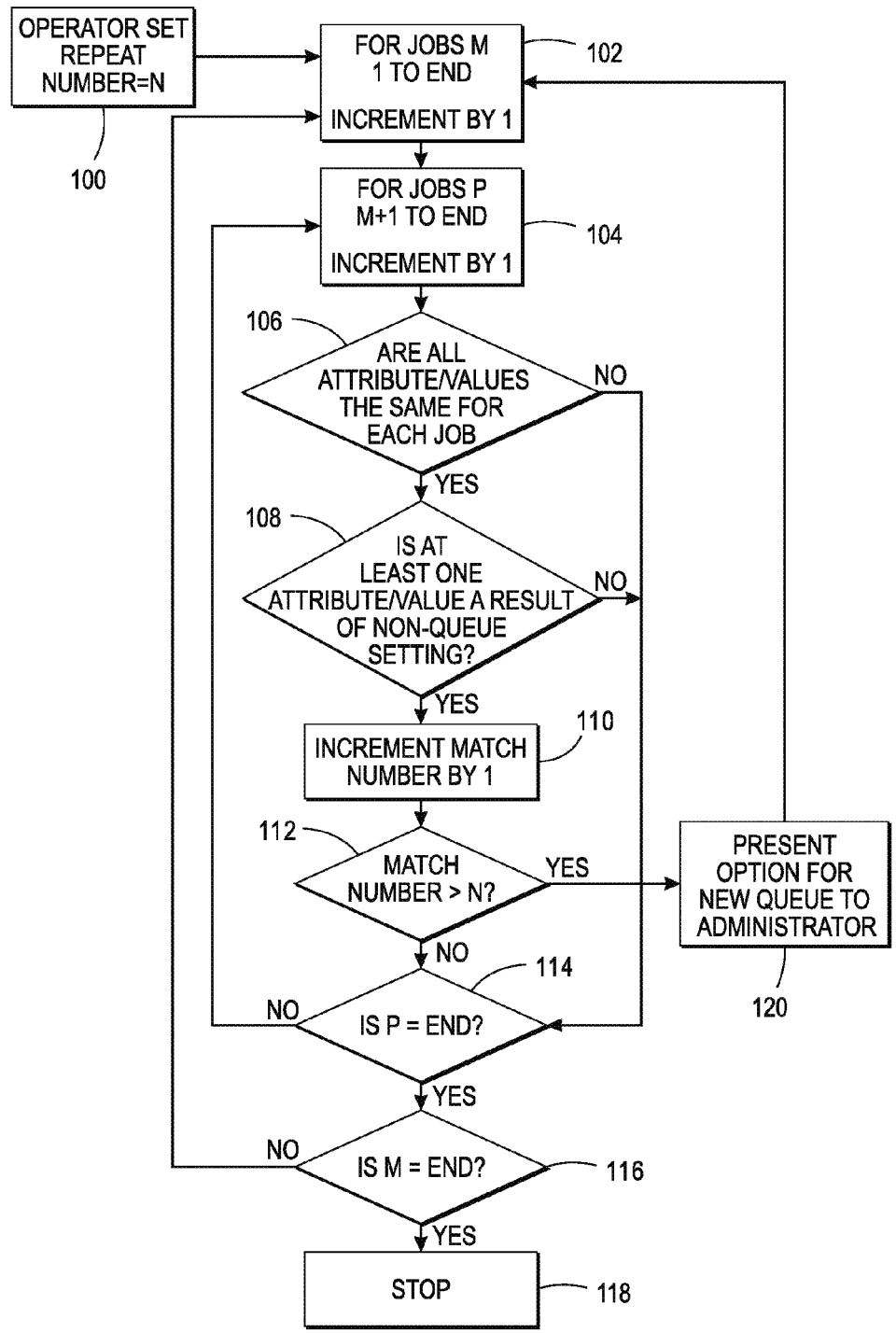
FIG. 1 is a flow diagram of various methods herein.

In view of this, as shown in FIG. 1, the various methods, devices, and systems herein begin at item 100 where a threshold parameter (N) is set that, when exceeded, causes the system to automatically create a new print queue to be presented to the user or administrator. Item 102 is an incrementing step where a counter (M) specifying the first of the two jobs being compared begins being incremented at 1. In item 104 a second counter (P) specifies the job that is to be compared with job M. The double loop continues until each pair of jobs in the unprocessed-job database has been compared as described below With the various counters established in items 100, 102, and 104, the loop of processing begins in item 106, where the processing determines whether all the attribute/value pairs actually used for the jobs (after any attribute reconciliation process has been applied) are the same for jobs M and P. If not, processing proceeds to item 114. If so, processing proceeds to item 108, which determines whether at least one attribute/value pair was established by an element other than the print queue (e.g., by the job ticket, job settings entered at the job management user interface, page description language setpoints, etc.). Again, if the determination is in the negative, processing proceeds again to item 114. However, if the determination in item 108 is in the affirmative, processing proceeds to item 110 where the attribute/value pair information is saved as a potential new print queue, and the corresponding match count is incremented by 1.

Item 112 determines whether the match number (e.g., the number of matches found so far for this particular combination of attribute values) exceeds the threshold N. If it does not, processing again proceeds to item 114. In item 114, the flow determines whether counter P is at the ending value. If it is not, processing returns to item 104 where P gets incremented to specify the next job. If it is, processing proceeds to item 116, where the flow determines whether counter M is equal to the ending value. If it is not, processing returns to item 102 where M gets incremented to specify the next job. If it is, processing ends at item 118.

However, if the match number does exceed threshold N, in item 112, processing proceeds to item 120, where the user is presented with an option of whether to automatically create a new queue. In item 120, when a common set of non-queue attribute/values is detected across sufficiently many print jobs (M), the graphic user interface presents a message informing the user that "it is proposed that a new queue be added with the following attribute/values due to common use." The user may continue or reject the proposal. If continue is selected, the proposed queue attributes are presented to the user. The user has the option to accept (and name the queue) or cancel.

One enhancement to the automatic queue creation flow depicted in FIG. 1 is that the comparison step 112 can determine whether the (Match number)*(number of non-queue attribute values) is greater than N. This exploits the fact that the labor and error reduction enabled by a queue is proportional not only to the frequency of its particular combination of attribute settings, but also to how many of the values are unique to the queue in question. Another enhancement to the automatic queue creation flow depicted in FIG. 1 loosens the restriction in step 106 by changing "all" to "sufficiently many." This increases the frequency of new-queue creation by exploiting the fact that a new queue can be valuable even when it does not match all values in the targeted subpopulation of jobs, particularly if the print server infrastructure allows non-matching attributes to have default precedence, or alternatively to have null values, on the proposed new queue).

Alternatively, the methods, devices, and systems herein can automatically create attribute subsets. An attribute subset is a named combination of job attribute values for a specific, predefined set of closely related job attributes relating to a single "category" of job behavior. Examples of such categories include: a print media (aka stock) category, and typical attributes of print media include type, size, weight, color; an imposition category and typical attributes of imposition include pages per row, pages per column, sheets per signature, sequencing, plex, orientation; a finishing category; a color management category; a scheduling category; With respect to terminology, attribute subsets for a given attribute category (category x) are sometimes referred to as "x templates" (e.g. "imposition templates") or simply as "x"'s belonging to an "x library") (e.g. "stocks" belonging to a "stock library").

Attribute subsets help streamline the task of creating and updating queues, and of programming jobs. They do this by allowing the SA or user to program all of the job attributes in a category by selecting a single item (e.g. "standard US Letter white" media, or "standard 2-up duplex" imposition) from a pulldown menu rather than by separately specifying each individual attribute value in the category. As it is often the case that a given job or queue cannot be programmed entirely based on already-existing attribute subset entries, systems supporting attribute subsets generally allow users to intermix them with attribute-level programming and tweaking (e.g. after selecting "standard US Letter white", the user may adjust this selection by setting the color value to green). Therefore, the systems and methods herein automatically create attribute subsets based on observed job usage.

Figure 2:
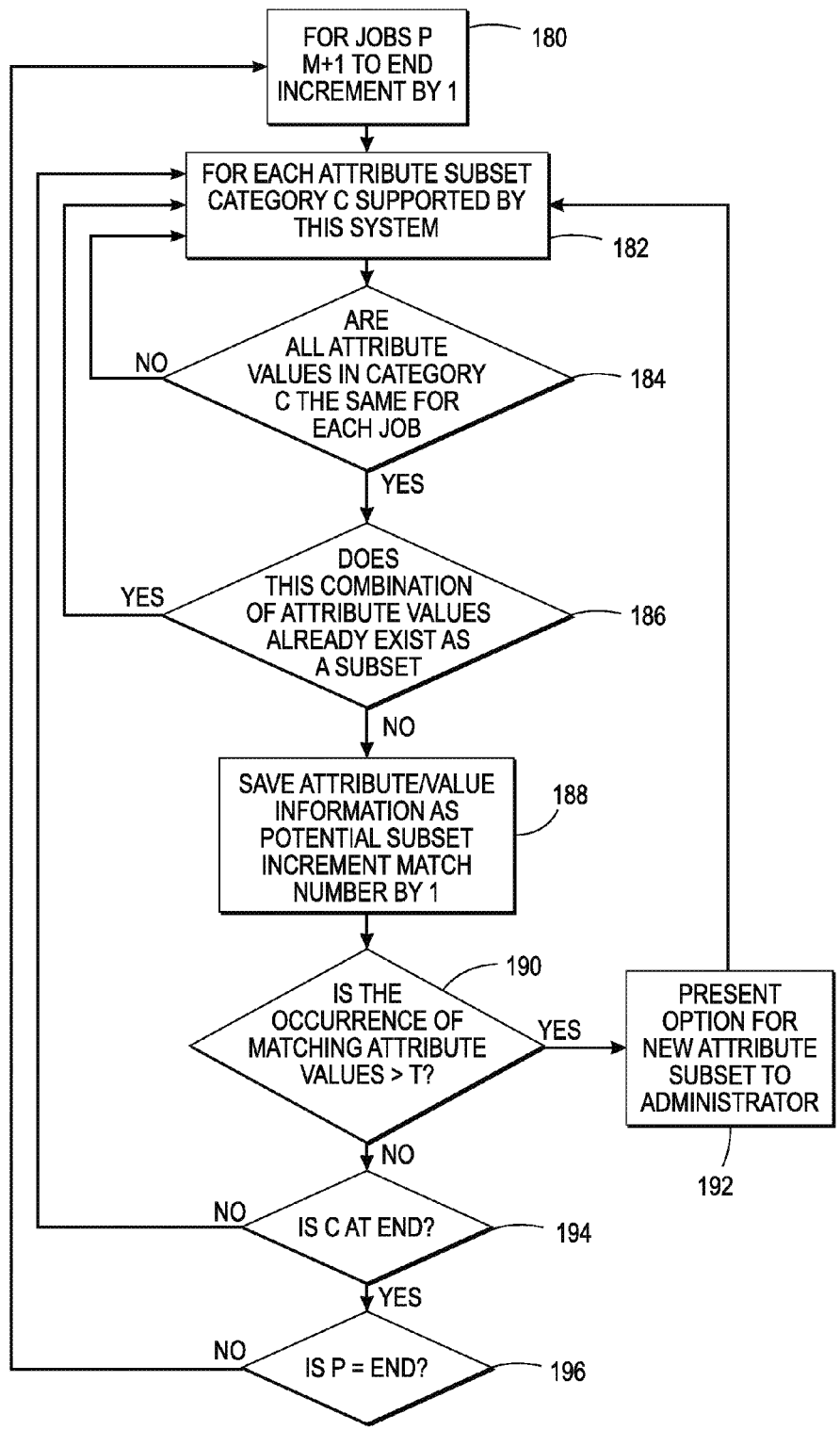
FIG. 2 is a flow diagram of various methods herein.

This auto-creation processing is shown in one example in FIG. 2. Thus, FIG. 2 illustrates a process for automatically creating print attribute subsets, although those ordinarily skilled in the art would understand that many other processes could be utilized to implement such processing. Specifically, as shown in FIG. 2, item 180 demonstrates that, for jobs incremented by the counter P from count M+1 to the end, the counter is incremented by 1. In item 182, for each attribute subset category (using identifier "C") supported by the methods and systems herein, the following processes (184-190) occur.

In item 184, a determination is made as to whether all attribute values in the category C are the same for each job. If not, processing returns to item 182; however if so, processing proceeds to item 186, where a determination is made as to whether the combination of attribute values already exists as a subset. If so, processing returns to item 182; however, if not, processing proceeds to item 188, where the attribute/value information is saved as a potential subset and the match number is incremented by 1.

In item 190, this flow determines whether the occurrences of the matching attribute values are greater than a threshold (using identifier "T"). If so, processing proceeds to item 192 where the option for a new attribute subset is presented to the administrator and processing returns to item 182. If not, processing proceeds to item 194 to determine whether the category C has been exhausted. If not, processing returns to item 182 for additional processing within category C; however, if category C has been exhausted, processing proceeds to item 196 to determine whether the counter P is at its limit. If so, processing ends; however, if not, processing returns to item 180 to begin the flow again.

Thus, when a common set of attribute/values is detected across sufficiently many jobs, the graphic user interface can additionally or alternatively present a message informing the user or administrator that "it is proposed that a new subset of job parameters be added/saved with the following attribute/values due to common use." The user may continue or reject the proposal. If continue is selected, the proposed queue attributes are presented to the user. The user has the option to accept (and name the attribute subset) or cancel. When building new queues or updating queues, the attribute subset names will be a selection. If selected, the attribute/value pairs (within the attribute subset) are populated on the queue. The user is also given the option to view the contents (categories of attribute/value pair sets, attribute/value pair sets, and individual attribute/value pairs) of the attribute subset.

The processes described in FIGS. 1 and 2 require the system to maintain a job log in which the queue name and as-applied attribute values for each processed job are logged after the final values of those attributes have been determined. These processes can be applied periodically by scanning the job log based on an SA-configurable time or job count interval.

Figure 3:
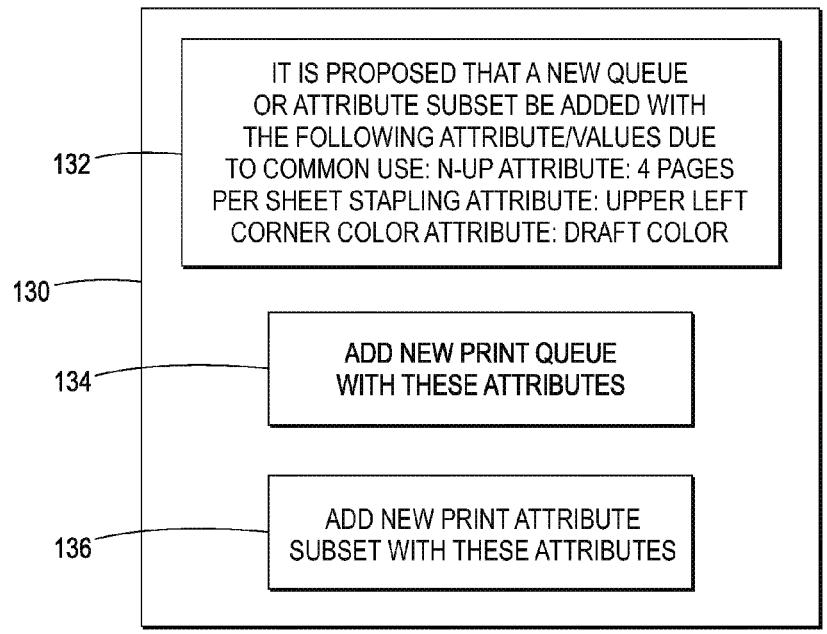
FIG. 3 is a screenshot presented on a graphic user interface by various methods herein.
Figure 4:
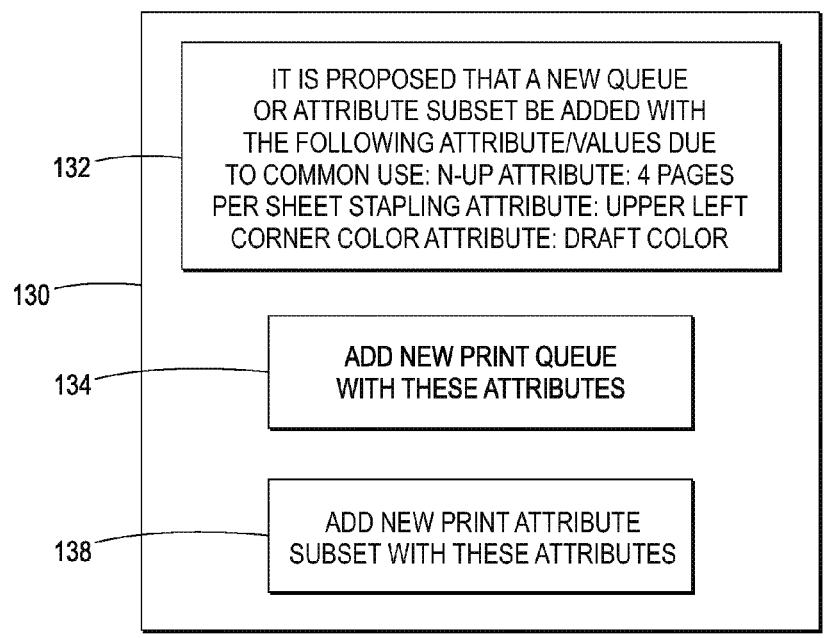
FIG. 4 is a screenshot presented on a graphic user interface by various methods herein.

Exemplary screens that can be presented to the user through the graphic user interface 130 by various methods herein, and some examples are shown in FIGS. 3-4. As noted above, if the methods herein recognize that many incoming jobs are using a particular combination of attribute/value pairs that are not already provided by some existing queue in the system (and the number of such jobs and attribute values make it potentially useful to create a queue pre-programmed with those values) then the methods herein will propose such a queue to the user. Therefore, as shown in FIG. 3, item 132 displays a message to the user proposing a new print queue or attribute subset be added with specific attributes (N-up attribute: 4 pages per sheet; stapling attribute: upper left corner; and color attribute: draft color). Using a cursor or other pointer device, the user can select radio button 134 which will add a new print queue with these attributes (using processes discussed herein); or the user can select radio button 136 which will add a new print attribute subset (again using processes discussed herein). FIG. 4 illustrates a similar screen 130 that provides the option for the user to select radio button 138 which will add a new attribute subset (again using processes discussed herein).

Figure 5:
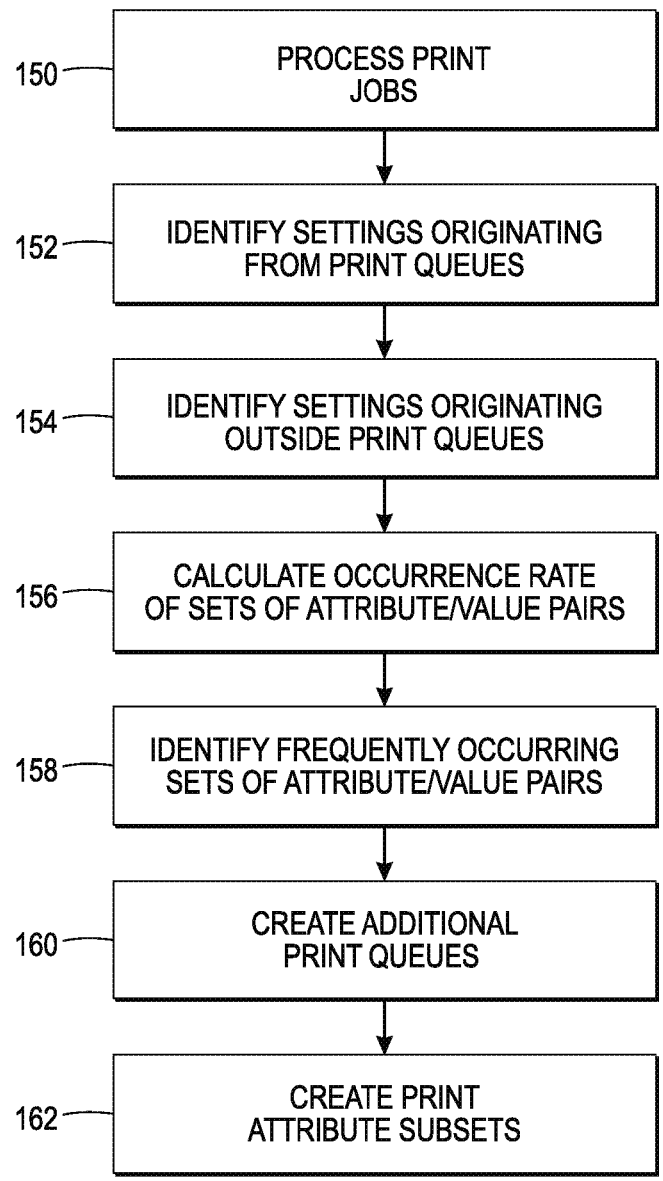
FIG. 5 is a flow diagram of various methods herein.

FIG. 5 is flowchart illustrating exemplary methods herein. In item 150, these methods process print jobs using a computerized device. More specifically, in item 150, a database can be used to monitor a print job from inception to completion, recording the attribute/value pairs settings that were made to create the print job, the sources of such attribute/value pair settings, the attribute/value pairs settings that were changed (and the sources of such changes), etc.

As shown in item 152, these methods automatically identify, within the print jobs, print queue printing and finishing settings that originate from print queues. Additionally, in item 154, these methods further automatically identify, within the print jobs, additional printing and finishing settings that are from sources other than the print queues (e.g., job tickets, job settings entered at the job management user interface, page description language setpoints, etc.). These additional printing and finishing settings can relate to different printing and finishing attributes from the attributes associated with the print queue printing and finishing settings.

As shown in item 156, such methods then automatically calculate the rate of occurrence of different groups or sets of specific printing and finishing attributes and associated values (sets of attribute/value pairs) within those "additional" printing and finishing settings. More specifically, in item 156, these methods group printing and finishing attributes and associated values into the sets of attribute/value pairs based on the attribute/value pairs occurring together in individual print jobs at a frequency above a specific threshold. These methods can then automatically identify the sets of attribute/value pairs that have occurrence rates that exceed the threshold as "frequently occurring sets of attribute/value pairs" in item 158.

With this, in item 160, these methods can automatically create new, additional print queues (that are formed in addition to the existing print queues) that apply these frequently occurring sets of attribute/value pairs to additional print jobs that are subsequently processed through the additional print queues. When creating such additional print queues in item 160, these methods can add to and/or replace the existing print queue printing and finishing settings with the frequently occurring sets of attribute/value pairs to differentiate the additional print queues from the existing print queues.

Alternative or additional methods can automatically create print attribute subsets within the print queues, as shown by item 162 in FIG. 5. These print queue and attribute subsets can be categorical/logical groupings of the frequently occurring sets of attribute/value pairs and are presented to the user as a menu selection for altering the existing print queues. Thus, such methods replace the print queue printing and finishing settings with the frequently occurring sets of attribute/value pairs in response to user selection of the menu selection for altering the print queues (user selecting one or more of the print attribute subsets).

For example, a specific print job may have 30 attribute/value pairs, and 10 of those attribute/value pairs may be set by a specific print queue after the print queue receives the print job. The other 20 attribute/value pairs may be set in the job ticket, job property file, page description language setpoints, etc. The methods, systems, and devices herein look for frequently occurring patterns in those 20 attribute/value pairs that were not set by the print queue. For example, it may be very common (occurrence at a frequency above a threshold) for the same 5 non-print queue attribute/value pairs (of the 20) to almost always be included in a large number of print jobs when that specific print queue is utilized. Therefore, as one very simplified example, the methods, systems, and devices herein add those 5 non-print queue attribute/value pairs to the existing 10 attribute/value pairs associated with that specific print queue when automatically creating a new print queue (after being instructed to do so by the user, by the user selecting the option to create a new print queue). Similarly, those 5 non-print queue attribute/value pairs can be utilized to create a new print attribute subset (again after being instructed to do so by the user, by the user selecting the option to create a new print attribute subset).

One ordinarily skilled in the art would understand that the foregoing example is tremendously simplified and that the numbers of attribute/value pairs involved are generally much larger. Further, when identifying the frequently occurring sets of attribute/value pairs in item 158, the methods, systems, and devices herein look for many different patterns of attribute/value pairs which can include logical patterns of attribute/value pairs based on the type of document that is the subject of the print job, the type of user that creates the print job, the type of machine utilized when creating the print job, the geographic area of the user creating the print job, the level of sophistication of the user creating the print job, etc. Additionally, the patterns of attribute/value pairs that are identified in item 158 include categories of attribute/value pairs, such as the type of printing machine that is utilized, the type of finishing equipment that is utilized, the volume of documents involved, etc.

Therefore, the methods, systems, and devices herein create new print queues and new print attribute subsets automatically without instruction from the user or administrator. These automatically created print queues and print attribute subsets are then presented to the user or administrator to allow the user or administrator to decide whether to utilize or authorize such print queues and print queues subsets. As would also be understood by those ordinarily skilled in the art, as the new print queues or new print attribute subsets are being added to the system, they can be modified by the administrator and/or user.

Figure 6:
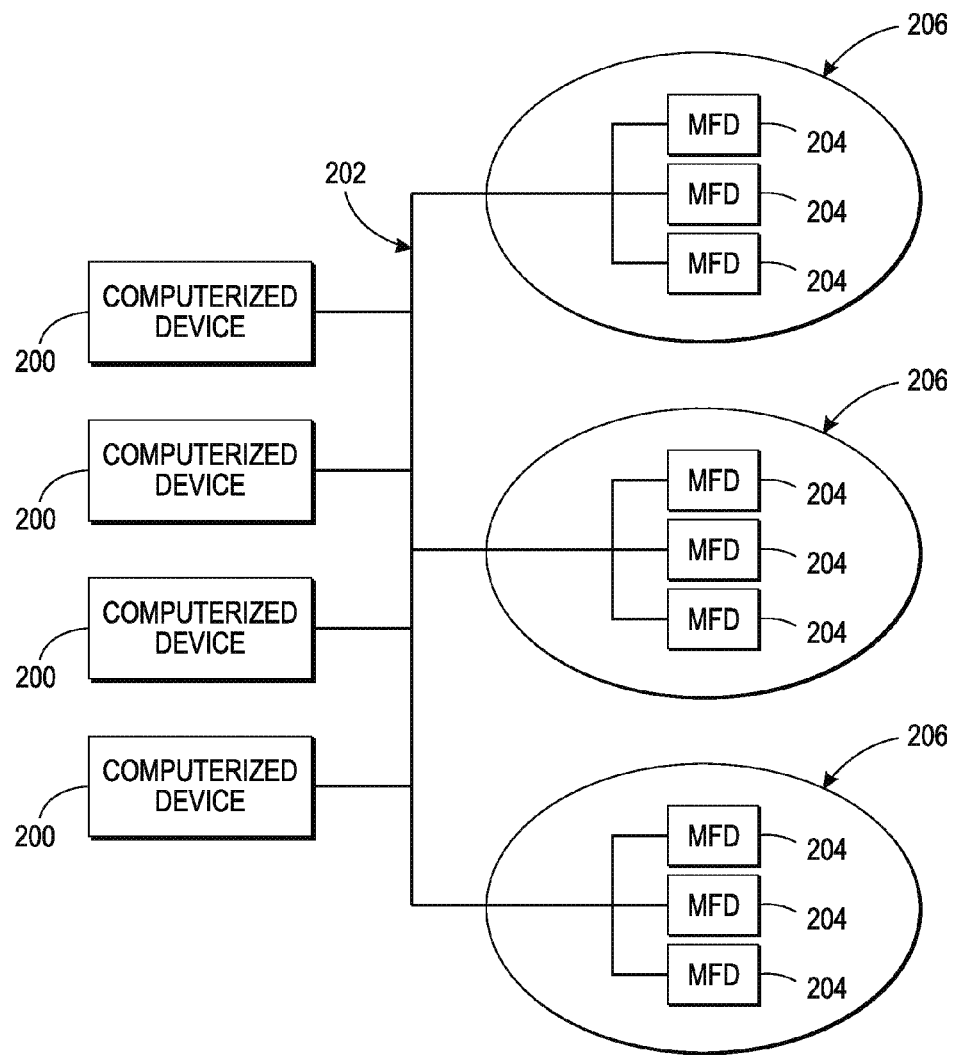
FIG. 6 is a schematic diagram illustrating systems herein.

As shown in FIG. 6, exemplary systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 7:
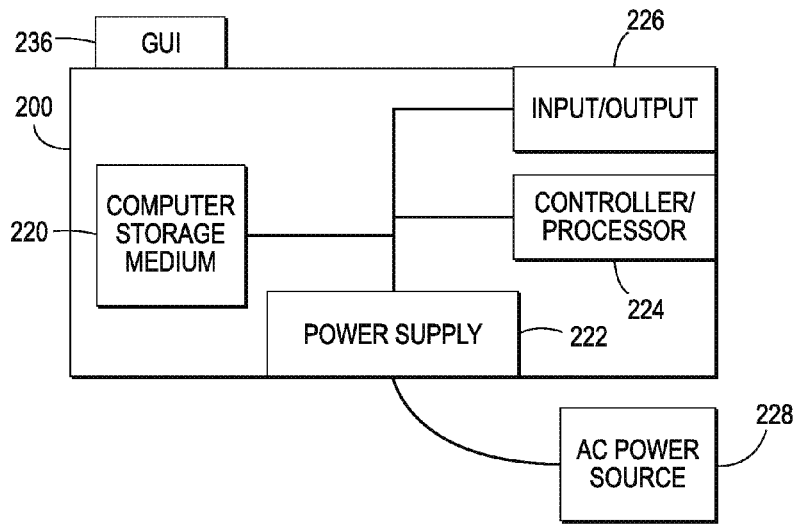
FIG. 7 is a schematic diagram illustrating devices herein.

FIG. 7 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 7, a body housing has one or more functional components that operate on power supplied from an alternating current (AC) source 228 by the power supply 222. The power supply 222 can comprise a power storage element (e.g., a battery, etc).

Figure 8:
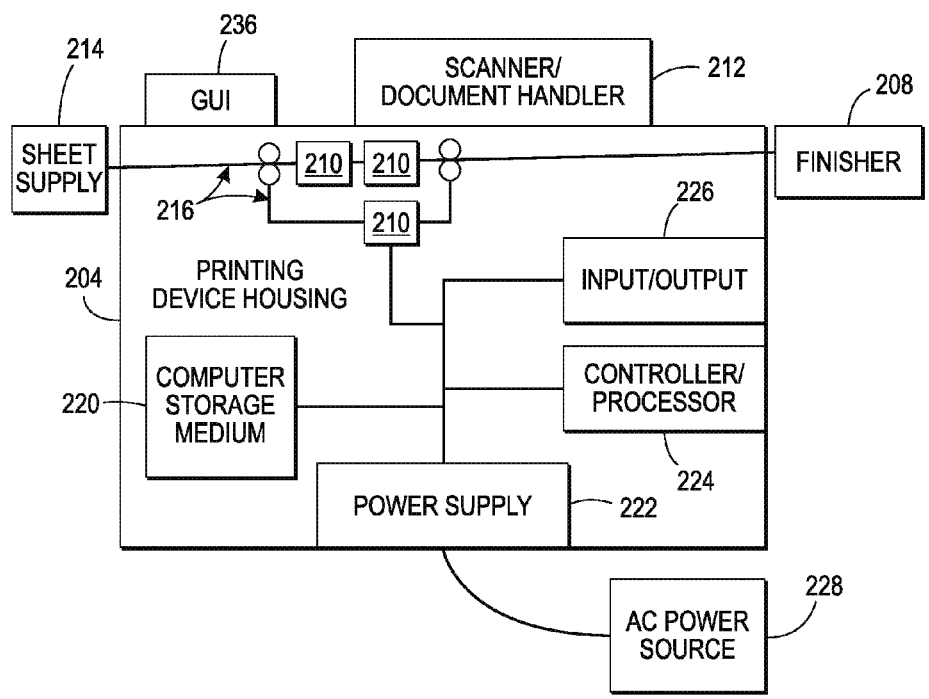
FIG. 8 is a schematic diagram illustrating devices herein.

FIG. 8 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Thus, the processor 224 automatically identifies, within the print jobs, print queue printing and finishing settings originating from print queues. The processor 224 also automatically identifies, within the print jobs, additional printing and finishing settings. The additional printing and finishing settings are again from sources other than the print queues. The processor 224 automatically calculates occurrences of sets of specific printing and finishing attributes and associated values within the additional printing and finishing settings. The processor 224 further automatically identifies the sets of specific printing and finishing attributes and associated values that have occurrences that exceed a threshold as frequently occurring sets of attribute/value pairs.

The processor 224 can then automatically create additional print queues and present the same to the user on the graphic user interface 236. Again, the additional print queues apply the frequently occurring sets of attribute/value pairs to additional print jobs processed with the additional print queue. The processor 224 can also automatically create print attribute subsets within the print queues. Again, the print attribute subsets are categorical groupings of the frequently occurring sets of attribute/value pairs and are presented as a menu selection to the user on the graphic user interface 236 for altering the existing print queues.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc.) are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
processing print jobs using a computerized device;
automatically identifying, within said print jobs, print queue printing and finishing settings originating from print queues using said computerized device;
automatically identifying, within said print jobs, additional printing and finishing settings using said computerized device, said additional printing and finishing settings being from sources other than said print queues;
automatically identifying ones of said sets of specific printing and finishing attributes and associated values having occurrences that exceed a threshold as frequently occurring sets of attribute/value pairs using said computerized device; and
automatically creating an additional print queue that is in addition to said print queues using said computerized device, said additional print queue applying said frequently occurring sets of attribute/value pairs to additional print jobs processed with said additional print queue.

2. The method according to claim 1, said additional printing and finishing settings being different printing and finishing values from said print queue printing and finishing settings.

3. The method according to claim 1, said creating said additional print queue comprising one of adding to and replacing ones of said print queue printing and finishing settings with said frequently occurring sets of attribute/value pairs.

4. The method according to claim 1, said sources other than said print queues comprising at least one of job tickets, job settings entered at job management applications, and page description language setpoints.

5. The method according to claim 1, further comprising automatically calculating occurrences of said sets of specific printing and finishing attributes and associated values comprising grouping printing and finishing attributes and associated values into said sets of printing and finishing attributes and associated values based on said printing and finishing attributes and associated values occurring together in individual ones of said print jobs at a frequency above said threshold.

6. A method comprising:
processing print jobs using a computerized device;
automatically identifying, within said print jobs, print queue printing and finishing settings originating from print queues using said computerized device;
automatically identifying, within said print jobs, additional printing and finishing settings using said computerized device, said additional printing and finishing settings being from sources other than said print queues;
automatically calculating occurrences of sets of specific printing and finishing attributes and associated values within said additional printing and finishing settings using said computerized device;
automatically identifying ones of said sets of specific printing and finishing attributes and associated values having said occurrences that exceed a threshold as frequently occurring sets of attribute/value pairs using said computerized device; and
automatically creating an attribute subset within said print queues, said attribute subset comprising categorical groupings of said frequently occurring sets of attribute/value pairs as a menu selection for altering said print queues, using said computerized device.

7. The method according to claim 6, said additional printing and finishing settings being different printing and finishing values from said print queue printing and finishing settings.

8. The method according to claim 6, further comprising replacing ones of said print queue printing and finishing settings with said frequently occurring sets of attribute/value pairs in response to user selection of said menu selection for altering said print queues using said attribute subset.

9. The method according to claim 6, said sources other than said print queues comprising at least one of job tickets, job settings entered at job management applications, and page description language setpoints.

10. The method according to claim 6, said automatically calculating occurrences of said sets of specific printing and finishing attributes and associated values comprising grouping printing and finishing attributes and associated values into said sets of printing and finishing attributes and associated values based on said printing and finishing attributes and associated values occurring together in individual ones of said print jobs at a frequency above said threshold.

11. A print server comprising:
an input/output port processing print jobs;
a processor operatively connected to said input/output port; and
a graphic user interface operatively connected to said processor,
said processor automatically identifying, within said print jobs, print queue printing and finishing settings originating from print queues,
said processor automatically identifying, within said print jobs, additional printing and finishing settings, said additional printing and finishing settings being from sources other than said print queues,
said processor automatically identifying ones of said sets of specific printing and finishing attributes and associated values having occurrences that exceed a threshold as frequently occurring sets of attribute/value pairs,
said processor automatically creating an additional print queue that is in addition to said print queues,
said additional print queue applying said frequently occurring sets of attribute/value pairs to additional print jobs processed with said additional print queue, and
said graphic user interface displaying said additional print queue and providing an option for said additional print queue to be utilized.

12. The print server according to claim 11, said additional printing and finishing settings being different printing and finishing values from said print queue printing and finishing settings.

13. The print server according to claim 11, said processor automatically creating said additional print queue comprising said processor one of adding to and replacing ones of said print queue printing and finishing settings with said frequently occurring sets of attribute/value pairs.

14. The print server according to claim 11, said sources other than said print queues comprising at least one of job tickets, job settings entered at job management applications, and page description language setpoints.

15. The print server according to claim 11, said processor automatically calculating occurrences of said sets of specific printing and finishing attributes and associated values comprising said processor grouping printing and finishing attributes and associated values into said sets of printing and finishing attributes and associated values based on said printing and finishing attributes and associated values occurring together in individual ones of said print jobs at a frequency above said threshold.

16. A print server comprising:
an input/output port processing print jobs;
a processor operatively connected to said input/output port; and
a graphic user interface operatively connected to said processor,
said processor automatically identifying, within said print jobs, print queue printing and finishing settings originating from print queues,
said processor automatically identifying, within said print jobs, additional printing and finishing settings, said additional printing and finishing settings being from sources other than said print queues,
said processor automatically calculating occurrences of sets of specific printing and finishing attributes and associated values within said additional printing and finishing settings,
said processor automatically identifying ones of said sets of specific printing and finishing attributes and associated values having said occurrences that exceed a threshold as frequently occurring sets of attribute/value pairs,
said processor automatically creating an attribute subset within said print queues,
said attribute subset comprising categorical groupings of said frequently occurring sets of attribute/value pairs as a menu selection for altering said print queues, and
said graphic user interface displaying said attribute subset and providing an option for said attribute subset to be utilized.

17. The print server according to claim 16, said additional printing and finishing settings being different printing and finishing values from said print queue printing and finishing settings.

18. The print server according to claim 16, said processor replacing ones of said print queue printing and finishing settings with said frequently occurring sets of attribute/value pairs in response to user selection of said menu selection for altering said print queues using said attribute subset.

19. The print server according to claim 16, said sources other than said print queues comprising at least one of job tickets, job settings entered at job management applications, and page description language setpoints.

20. The print server according to claim 16, said processor automatically calculating occurrences of said sets of specific printing and finishing attributes and associated values comprising said processor grouping printing and finishing attributes and associated values into said sets of printing and finishing attributes and associated values based on said printing and finishing attributes and associated values occurring together in individual ones of said print jobs at a frequency above a said threshold.

* * * * *